United States Patent [19]

Feldman et al.

[11] Patent Number: 5,372,846
[45] Date of Patent: Dec. 13, 1994

[54] HEAT BLOCKING MATERIALS AND METHODS

[75] Inventors: Rubin Feldman, Ladue, Mo.; Sina Ghatan, Belleville, Ill.

[73] Assignee: Nu-Chem, Inc., Fenton, Mo.

[21] Appl. No.: 57,993

[22] Filed: May 5, 1993

[51] Int. Cl.$^5$ .......................... B05D 3/08; C09D 5/18
[52] U.S. Cl. .................. 427/224; 427/372.2; 427/375; 427/384; 427/385.5; 427/386; 427/393.3; 106/18.11; 106/18.13; 106/18.24; 106/18.26; 106/18.28; 106/18.14; 252/601; 252/605; 252/606; 428/920; 428/921
[58] Field of Search ............... 106/18.11, 18.24, 18.26, 106/18.28, 18.14, 18.13; 427/372.2, 385.5, 386, 393.3, 384, 224, 375; 252/601, 605, 606; 428/920, 921

[56] References Cited

U.S. PATENT DOCUMENTS

| | | | |
|---|---|---|---|
| 2,680,077 | 6/1954 | Nielsen et al. | 106/18.16 |
| 3,022,190 | 2/1962 | Feldman | 165/1 |
| 3,284,216 | 11/1966 | Kaplan | 106/16 |
| 3,730,940 | 5/1973 | Versnel et al. | 106/18.24 |
| 3,849,178 | 11/1974 | Feldman | 428/446 |
| 3,913,290 | 10/1975 | Billing et al. | 52/347 |
| 3,915,777 | 10/1975 | Kaplan | 156/202 |
| 4,018,962 | 4/1977 | Pedlow | 428/245 |
| 4,064,359 | 12/1977 | Peterson et al. | 428/920 |
| 4,069,075 | 1/1978 | Billing et al. | 156/71 |
| 4,264,364 | 4/1981 | Lippoldt | 106/18.28 |
| 4,276,332 | 6/1981 | Castle | 428/920 |
| 4,292,358 | 9/1981 | Fryer et al. | 428/135 |
| 4,493,945 | 1/1985 | Feldman | 428/920 |
| 4,529,467 | 7/1985 | Ward et al. | 106/18.13 |
| 4,702,861 | 10/1987 | Farnum | 106/18.11 |
| 5,182,049 | 1/1993 | von Bonin | 106/18.11 |

*Primary Examiner*—Anthony Green
*Attorney, Agent, or Firm*—Polster, Lieder, Woodruff & Lucchesi

[57] ABSTRACT

A product and process by which heat from hyperthermal sources is blocked by compositions including coordination complexes. The compositions provide a sustained, uniform, and controlled method of heat blockage in an artificial boundary layer or heat exchange matrix. When the compositions are incorporated in a coating composition, the rate of discharge of the coating medium is continuous, gradual, and controlled to the desired rate level for a given thermal environment.

38 Claims, 3 Drawing Sheets

HEAT BLOCKING MATERIALS AND METHODS

BACKGROUND OF THE INVENTION

This invention relates to methods and compositions for protecting materials from thermal extremes and from flame. It also relates to methods of making the compositions.

The situation in which it is desirable to protect materials from heat and flame include, for example, protecting static structures such as petroleum storage tanks, chemical production equipment, electrical cable trays, and structural steel from the spread of fire; protecting transportation equipment such as tank cars, aircraft cabins and seat cushions from the same risks; protecting the exterior surfaces of spacecraft and high performance aircraft from heat generated by atmospheric friction; and protecting the nozzles of rocket engines from the heat of propellant gases.

Numerous thermal protective coating materials and systems for applying them are known. Some of the materials are foamed passive insulative materials which protect merely by their low thermal conductivity and their thickness as applied. These include foamed cement or intumesced silicates. Other materials provide active thermal protection. Some intumesce when heated to form a thick closed cell protective layer over the substrate. These include silicate solutions or ammonium phosphate paints or materials such as those disclosed in Nielsen et al., U.S. Pat. No. 2,680,077 or Kaplan, U.S. Pat. No. 3,284,216. Other active thermal protective materials include constituents which sublime at a predetermined temperature, such as those disclosed in Feldman, U.S. Pat. No. 3,022,190. The active thermal protective materials disclosed in Feldman, U.S. Pat. No. 3,849,178 are particularly effective; when subjected to thermal extremes, these materials both undergo an endothermic phase change and expand to form a continuous porosity matrix.

Various methods and structures have also been used or proposed for applying these thermal protective coating materials. The most frequent approach is to apply the materials directly to the substrate, without additional structure. For many applications, however, a reinforcing material, such as fiberglass sheet or a wire mesh, has been embedded in the coating material to strengthen the material and prevent it from cracking or falling off the substrate under conditions of flame or thermal extreme. Examples of this approach are found in Feldman, U.S. Pat. No. 3,022,190, Billing et al, U.S. Pat. No. 3,913,290, Kaplan, U.S. Pat. No. 3,915,777, and Billing et al, U.S. Pat. No. 4,069,075. Sometimes the materials are first applied to a reinforcing structure such as a flexible tape or flexible wire mesh, and the combined structure is applied to the substrate. Examples of this approach are found in Feldman, U.S. Pat. Nos. 3,022,190, Pedlow, 4,018,962, Peterson et al, 4,064,359, Castle, 4,276,332, and Fryer et al,4,292,358. In these last-mentioned systems, the purpose of the reinforcing structure may be both to strengthen the resulting composite and to permit its application to a substrate without directly spraying, troweling or painting the uncured coating materials onto the substrate. In any of the foregoing methods and structures, multiple layers are frequently applied to the substrate to provide additional protection.

Presently known materials and methods, however, are not as efficient, in terms of length of protection for a given weight of protective material, as desirable. Efficiency is particularly important because in many applications weight or volume is critically limited. Moreover, heavily loading coating materials with fire retardants may seriously impair their physical characteristics and otherwise limit their suitability as coatings, for example by limiting their film-forming characteristics or their water-resisting characteristics. Presently known materials are thus frequently limited to certain types of applications.

SUMMARY OF THE INVENTION

One of the objects of this invention is to provide systems and compositions for providing more efficient protection against hyperthermal conditions than presently known compositions and systems.

Another object is to provide such systems and compositions which are adaptable to a wide variety of applications.

Another object is to provide such systems and compositions which provide particularly good protection when incorporated in coatings applied to substrates with or without reinforcement or additives.

Another object is to provide such systems and compositions which may be incorporated into the materials being protected or into structures applied to the materials being protected.

Another object of this invention is to provide such systems and compositions which may be tailored for use at different temperature ranges and different ambient conditions.

Other objects of this invention will be apparent to those skilled in the art in light of the following description and accompanying drawings.

In accordance with this invention, generally stated, compositions and systems for protection against hyperthermal heating are provided which incorporate a coordination complex which undergoes multiple endothermic transitions from solid to gaseous state over a substantial temperature range. A coordination complex is "a compound or ion that contains a central usu. metallic atom or ion combined by coordinate bonds with a definite number of surrounding ions, groups, or molecules, that retains its identity more or less even in solution, and that may be nonionic {as tri-ammine-trinitro-cobalt $[Co(NH_3)_3(NO_2)_3]^0$}, cationic {as hex-ammine-cobalt-(III) $[Co(NH_3)_6]^{+++}$}, or anionic {as hexachloroplatinate $[PtCl_6]^{--}$}." *Webster's Third International* dictionary (unabridged). Coordination complexes of transition metals are particularly useful, and the salts of such complexes with anions having thermal resistive qualities are particularly preferred. Preferably, the coordination complexes include a three dimensional (tricombic) complex including six ligands which are directly attached to a metal ion and are regarded as bonded to it. A ligand is "a group, ion, or molecule coordinated to the central atom in a coordination complex."

One preferred such salt for use in the present invention is hexamminenickel(II) difluoroborate. This salt includes an octahedrally coordinated complex of nickel(II) with six ammonia molecules oriented in such a way that one unshared pair of electrons from each ammonia is pointed directly at the metal ion to form the resultant complex cation $[Ni(NH_3)_6]^{2+}$. Further reaction of this metal complex with two tetrafluoroborate $(BF_4)^{-1}$ anions forms the desired complex salt.

Other exemplary salts of coordination complexes are hexamminezinc(II) difluoroborate, a similar salt of a perhaps tetrahedrally coordinated complex of zinc with six ammonia molecules and two tetrafluoroborate anions ($[Zn(NH_3)_6](BF_4)_2$) and diaquotetraamminezinc-(II) difluoroborate ($[Zn(NH_3)_4(H_2O)_2](BF_4)_2$).

Many other coordination complexes are operative, although methods for the large-scale production of some of them have not yet been described. Other exemplary complexes include the following:

$[Ag(NH_3)_2](BF_4)$
$[Co(H_2O)_6](BF_4)_2$
$[Co(NH_3)_6](BF_4)_2$
$[Fe(H_2O)_6](BF_4)_2$
$[Fe(H_2O)_5F](BF_4)_2$
$[Ni(H_2O)_6](BF_4)_2$
$[Cd(NH_3)_6](BF_4)_2$
$[Cu(NH_3)_4](BF_4)_2$
$[Ag(NH_3)_2](SnF_6)$
$[Co(H_2O)_6](SnF_6)_2$
$[Co(NH_3)_6](SnF_6)_2$
$[Fe(H_2O)_6](SnF_6)_2$
$[Fe(H_2O)_5F](SnF_6)_2$
$[Ni(NH_3)_6](SnF_6)_2$
$[Ni(H_2O)_6](SnF_6)_2$
$[Cd(NH_3)_6](SnF_6)_2$
$[Cu(NH_3)_4](SnF_6)_2$
$[Zn(NH_3)_4(H_2O)_2](SnF_6)_2$
$[Ag(NH_3)_2](SbF_6)$
$[Co(H_2O)_6](SbF_6)_2$
$[Co(NH_3)_6](SbF_6)_2$
$[Fe(H_2O)_6](SbF_6)_2$
$[Fe(H_2O)_5 F](SbF_6)_2$
$[Ni(NH_3)_6](SbF_6)_2$
$[Ni(H_2O)_6](SbF_6)_2$
$[Cd(NH_3)_6](SbF_6)_2$
$[Cu(NH_3)_4](SbF_6)_2$
$[Zn(NH_3)_4(H_2O)_2](SbF_6)_2$.

Although the foregoing fluorine-containing salts are preferred for their heat resistant qualities, other salts may also be utilized. Halogen-containing anions are preferred. The complex may also be anionic or neutral, and salts in which both anion and cation are coordination complexes may be utilized. The metal ions of the preferred complexes form oxides in a fire atmosphere, and form thermally reflective components. Other endothermically decomposing complexes may also be used, including alkylamine complexes (methylamine through butylamines), such as salts of tetramethlyamminezinc-(II) or dimethylamminenickel(II). A chelating ligand may be also be used instead of an ordinary ligand. A chelating ligand is one containing two or more functional groups so arranged that they can simultaneously occupy positions in the first coordination sphere of the metal ion. Familiar examples are lower alkyleneimines such as ethylenediamine and methylenediamine.

In prior compositions including subliming agents, sublimation takes place at a fixed temperature. In the present invention, gaseous evolution and active heat blockage may begin at a fixed temperature, but this indicates only the starting point of the heat blockage of the new material, which provides heat blockage continuously in a step-wise manner through a substantial temperature range. The present compositions give substantially increased rates of heat blockage, over substantially longer periods and higher temperature gradients.

The coordination complexes may be introduced into porous matrices, such as a porous metal or pyrolytic graphite, or placed under such matrices which are liable to exposure to flame or thermal extremes. The coordination complexes may also be blended with other materials in ratios ranging from about five percent to about ninety percent by weight, preferably about 20% to about 70% by weight. They are particularly useful in coatings. They can be incorporated in compositions which are formed by molding or extruding. In all applications, the material gives a continuous, controlled release of heat blocking material over a defined temperature range.

When the complex is added to a film-forming resin, it may form a superior intumescing agent. When properly matched to the resin, it will also provide protection in accordance with Feldman, U.S. Pat. No. 3,849,178. To provide an effective intumescing action, and to provide an open porosity matrix on application of excess heat, it is important that the carrier resin soften at a temperature near the temperature at which the active material undergoes a phase change, and to provide a heat exchange path for the gases produced by the active material. With previously known active materials, the temperature range of the phase change is small. Hence, the depth from the surface at which the matrix material softens and the active material undergoes a phase change is quite well defined at any given time in the course of exposure to a hyperthermal event such as a fire. The present materials, by contrast, undergo continuous endothermic phase changes over a wide temperature range. This provides a prolonged action of the gasses, and provides a long-term, controlled swelling, and much thicker char layers than previously obtainable, up to twenty times the original thickness of the coating. This provides a longer heat exchange path for the gasses to flow through, in the form of long, connected, open cells. The added retention time of the gasses in the matrix increases the thermal efficiency. Furthermore, the combination of a thick heat exchange matrix having a high temperature at its exposed face and a much lower temperature deeper in the coating, together with an active mechanism within the layer for absorbing and radiating heat, makes the coating an efficient radiator of heat.

For example, the complexes have been mixed with an epoxy-based matrix, with or without flexibilizers, reinforcing fibers, and the like. These complex-containing coatings have been found to give more efficient heat blocking per unit thickness of coating on a substrate.

Therefore, greater thermal protection can be given with the same thickness of material, without sacrificing physical properties of the material. Alternatively, the thickness and weight of the material may be decreased without sacrificing thermal protection, or the material may be formulated with a higher proportion of ingredients which improve the physical properties of the material, such as rheology-enhancing materials, film-formers, heat reflective agents, waterproofing agents, and the like.

The matrix may be strengthened with fibers, inorganic cloth, wire mesh, or otherwise. The fibers may constitute as little as one percent of the matrix or as much as seventy percent. The fibers may be long or a mixture of long and short fibers to provide for the maximum string capability in a particular environment, such as the wall of a tank car, or a structural steel beam, or the throat of a rocket engine. Fibers may be introduced as free fibers, or as a glass or graphite cloth, or as a three-dimensional fabric, for example.

Other materials, particularly those of polyanionic phosphorus-nitrogen compounds (such as ammonium polyphosphate) which have previously been demonstrated to be effective in thermally protective coatings, are believed to have a further synergistic effect with the transition metal complexes of the present invention. In fact, some of the materials of the present invention may be chemically combined with those polyanionic compounds or a precursor of those polyanionic compounds, in particular polyphosphoric acids, to provide a compound having superior heat blockage characteristics. Materials containing phosphorus and nitrogen are known to promote char formation. It is therefore believed that the combination of the present complexes containing nitrogen moieties into a compound containing phosphorus provides a long chain compound combining both endothermic phase change and char formation in one step. The materials combining tricombic transition metal complexes with polyphosphate may be formed from those compounds themselves, or they may be formed in situ during the formation of the complex or the polyphosphate. The complexes can also be blended with numerous polyanionic phosphorus-nitrogen containing compounds such as melamine pyrophosphate or monoammonium phosphate.

The complexes themselves can be blended to give a broader range of temperatures at which they perform their heat absorbing or blocking functions, and they can also be microencapsulated so as to increase the partial pressure of the complexes as they are exposed to heat and thereby raise the temperature at which they become active.

Other aspects of the invention will be better understood in the light of the following description of the preferred embodiments of materials in accordance with the present invention and examples of making and using them.

DESCRIPTION OF THE PREFERRED EMBODIMENTS

Figure 1:
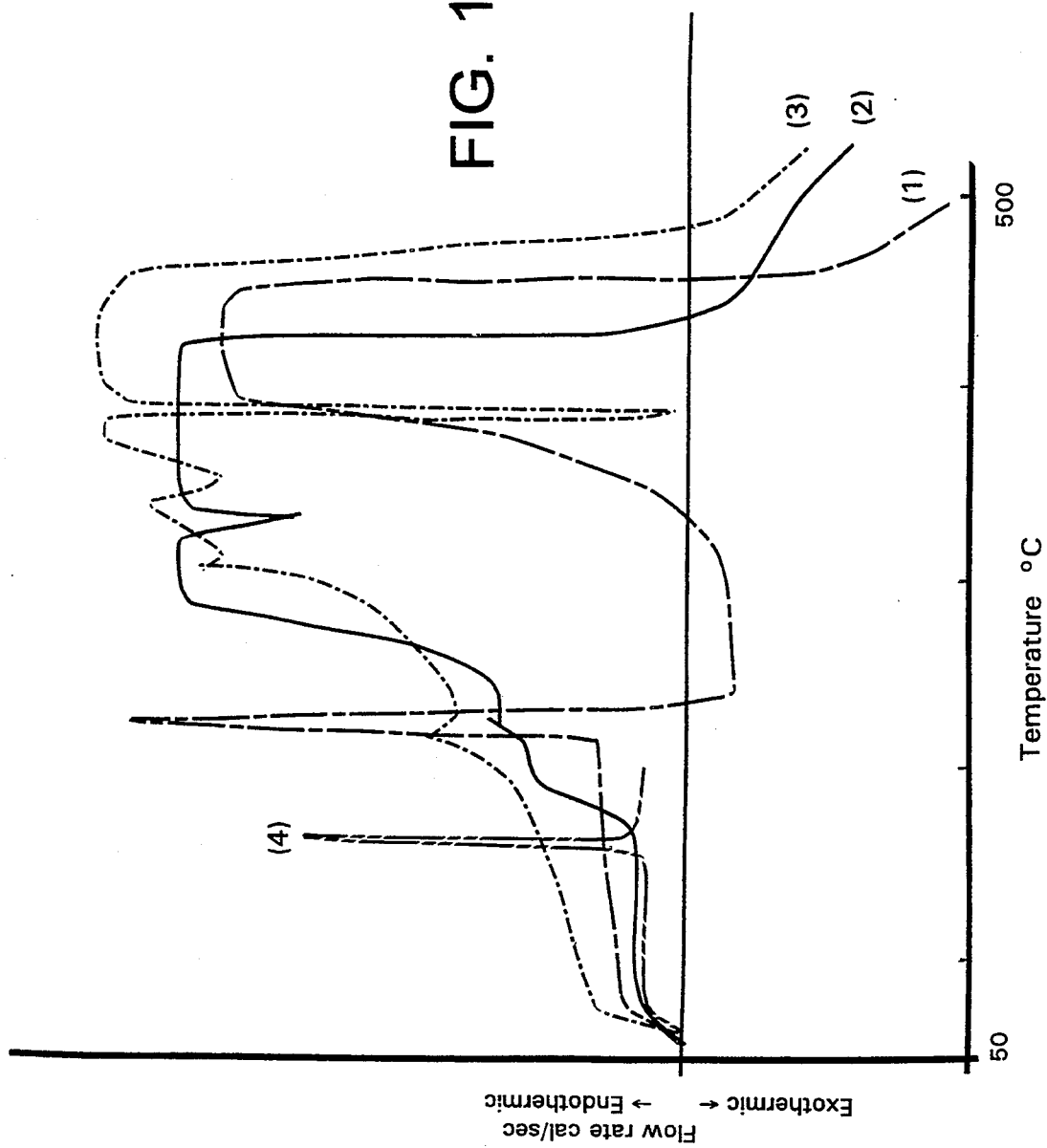
FIG. 1 is a graphical representation of differential scanning calorimetry thermograms for illustrative coordination complexes in accordance with the present invention.

The following Examples are illustrative of the methods of making the complexes for use in the present invention, of the compositions and methods of the present invention, and of their performance in comparison with previously known compositions and methods.

EXAMPLE 1

Tricombic hexamminenickel(II) difluoroborate for use in the present invention was made by dissolving 0.01 mole of $NiCl_2 \cdot 6H_2O$ (2.38 g) in 40 ml $H_2O$, and adding 100 ml of concentrated $NH_4OH$. The green color of the solution changed instantaneously to a characteristic blue as the nickel chloride reacted to form the hexamminenickel complex. Excess unreacted $NiCl_2 \cdot 6H_2O$ was removed by filtration. To the clear blue solution was added 0.02 moles of $NH_4BF_4$ (2.09 g) with stirring. After all the ammonium fluoroborate had been added, the mixture was stirred for fifteen more minutes, then allowed to stand at room temperature for thirty minutes. A light blue solid precipitate formed. The precipitate was filtered through a fast filter #41. Excess $NH_4BF_4$ was removed by washing with 100 ml dilute (10%) $NH_4OH$. The process produced about 93% of theoretical yield of hexamminenickel(II) difluoroborate, having a distinct blue color and a solubility of about 1.3% to 1.5%.

The solubility of the material may be further reduced below 1% by washing with hot 10% $NH_4OH$.

EXAMPLE 2

Tricombic diaquotetraamminezinc(II) and hexamminezinc(II) difluoroborate for use in the invention were made in a similar manner. 0.1 mole of $ZnCl_2$ (13.6 g) was dissolved in 40 ml deionized $H_2O$, and 100 ml of concentrated $NH_4OH$ was added. The clear solution changes rapidly to a milky white color of diaquotetraamminezinc(II). Further addition of excess ammonia produces hexamminezinc complex. Separately, 0.2 moles of $NH_4BF_4$ (20.9 g) is stirred into 25 ml of water, then added slowly to the desired zinc ammine complex. A gel-like material is formed which upon further mixing for 15 minutes is let to stand at room temperature for 30 minutes. The precipitate is collected, washed, filtered, and dried.

EXAMPLE 3

A conjugate of hexamminenickel(II) fluoroborate and a polyphosphate was formed by adding to 500 grams of polyphosphoric acid, $H(PO_3H)_nOH$, having a phosphoric acid equivalent of 115%, 500 grams of tetrafluoroboric acid, $HBF_4$, having an acid equivalent of 50%, with mixing. This syrupy mixed "super"-acid was added in an ice bath to a 90% ammoniacal solution of nickel II complex (900 g. nickel complex in 100 g. ammonia) and mixed. There was an exothermic reaction of about 50° C., and the blue color of the hexamminenickel complex changed to a light green as the exotherm continued. The material was let stand and it solidified. The resulting solid was collected and pulverized, then washed once with water to remove unreacted materials and soluble by-products.

Fourier transform infrared (FTIR) analysis of this new complex revealed bond formation of phosphorus-nitrogen as expected in the 3300 $cm^{-1}$ region.

Thermogravimetric analysis (TGA) of this complex indicated a more stable complex. Its thermograms had two distinct peaks at temperatures of $T_1 = 182°$ C., with 96% of the material still remaining, and at $T_2 = 281°$ C. with 81% of the material remaining. The mass loss at final temperature of 750° C. was 56%, i.e., 44% of the material remained as char. The complex has a solubility of 7.12% and a pH of 6.73.

Differential scanning calorimetric (DSC) analysis of this material indicated an endothermic decomposition at $T_1 = 210°$ C. to 230° C. and a major endothermic peak starting at 300° C. to 450° C.

EXAMPLE 4

A conjugate of diaquotetraamminezinc(II) fluoroborate and a polyphosphate was similarly formed by mixing 500 grams of polyphosphoric acid having a phosphoric acid equivalent of 115% with 500 grams of tetrafluoroboric acid, having an acid equivalent of 50%. This syrupy mixed "super"-acid was added in an ice bath to a 90% ammoniacal solution of zinc II complex (900 g. zinc complex in 100 g. ammonia) and mixed. There was an exothermic reaction of about 65° C. without change in the color of the zinc complex. The material solidified and was pulverized. The material was 85% soluble and had a pH of 3.5.

TGA indicated 91% of the material remaining at $T_1=289°$ C. and 60% remaining at $T_2=396°$ C. The final mass (char) at 750° C. was 41% of the original material.

DSC of this complex also indicated an endothermic decomposition starting at $T_1=216°$ C. to 283° C. and a major endothermic peak starting at 372° C. to 445° C.

EXAMPLE 5

The materials of Examples 1–4 were tested in a differential scanning calorimeter (DSC). A DSC measures and records the energy necessary to maintain thermal equilibrium between a test sample and a reference. Indium is used as a calibration standard. Generally, a sample of known mass is heated at a constant temperature rate and the rate at which energy is absorbed (endothermic) or released (exothermic) is recorded against temperature. A phase change is represented as a peak. The area under the peak is proportional to the heat of fusion, sublimation or vaporization. In such devices, the rate of heat flux is a function to the fourth power of the temperature. Therefore, the rate of heat flux may be directly correlated with temperature.

As shown in FIG. 1, the DSC analysis shows that a simple endothermic material, illustratively ammonium fluoroborate (1), decomposes endothermically at 220° C. by losing its ammonia as gas; more importantly, this compound provides no additional endothermic mechanism until it reaches about 400° C.

By contrast, hexamminenickel(II) difluoroborate (2) and diaquotetraamminezinc tetrafluoroborate (3) begin to decompose endothermically below 200° C. and continue to decompose in a generally continuous and increasingly endothermic manner to a temperature well in excess of 400° C. for the nickel complex and 450° C. for the zinc complex. The total amount of energy absorbed, as represented by the area under the peaks, indicates that the materials are far better heat blockers than simple compounds like ammonium fluoroborate and that they will provide superior heat blockage when incorporated in substrates or in coatings applied to substrates. The indium calibration standard is shown as (4) in FIG. 1.

Figure 2:
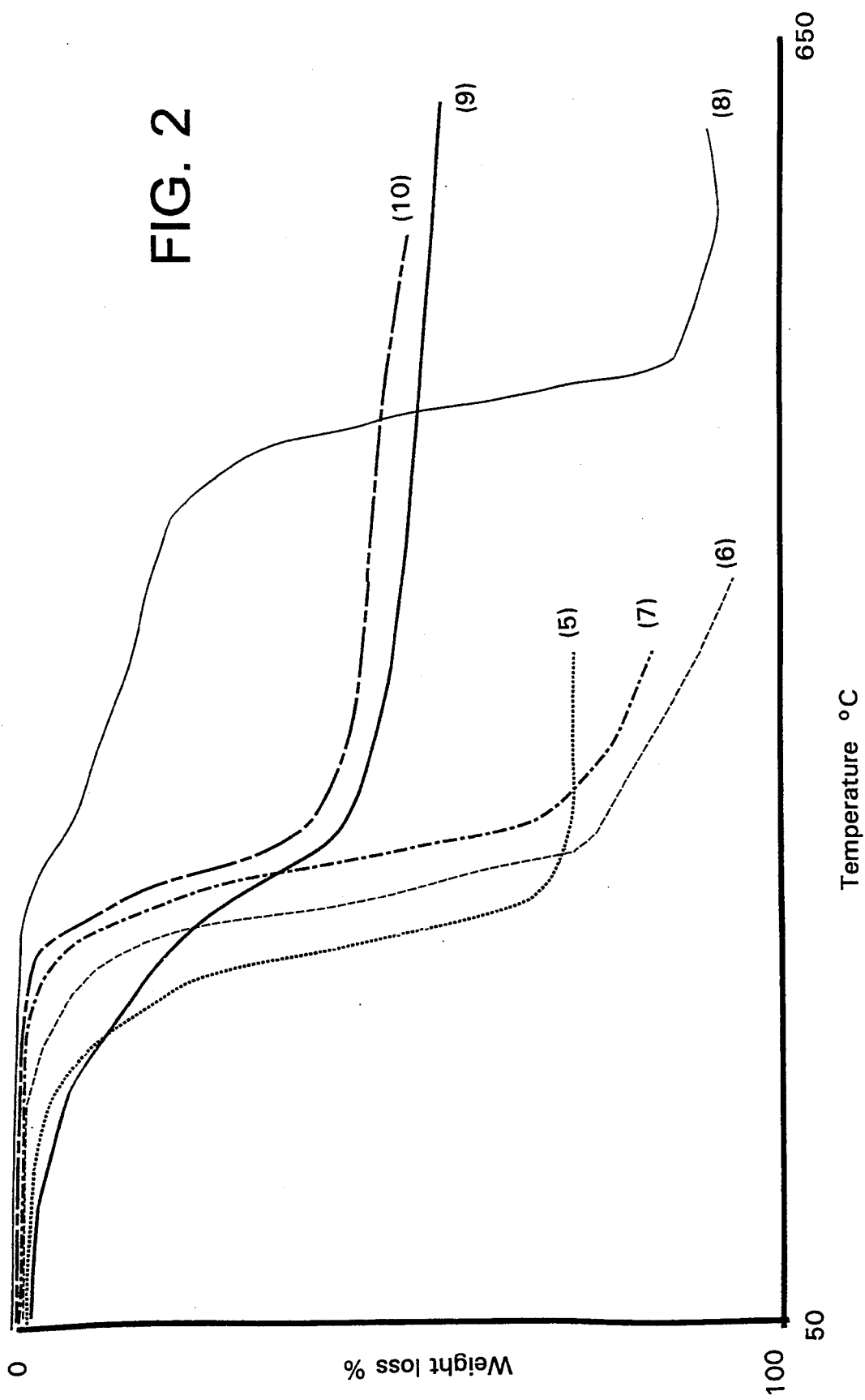
FIG. 2 is a graphical representation of thermogravimetric analyses of illustrative coordination complexes in accordance with the present invention, selected prior art materials also being shown for comparison.

As shown in FIG. 2, a thermogravimetric analysis (TGA) of hexamminenickel(II) difluoroborate (5) and diaquotetraamminezinc tetrafluoroborate (6) confirms that the unconfined materials decompose to gaseous components at lower temperatures than pentaerythritol (7) or ammonium polyphosphate (8), and that they both leave a substantial solid residue. The TGA's of hexamminenickel(II) polyphosphoborate (9) of Example 3 and diaquotetraamminezinc(II) polyphosphoborate (10) of Example 4 are also shown in FIG. 2. The relatively low temperatures at which the tricombic complexes of the present invention volatilize provide early absorption of energy in a fire or other hyperthermal event. The TGA does not, of course, reflect recombinations which occur in a typical fire or other hyperthermal event.

EXAMPLE 6

Figure 3:
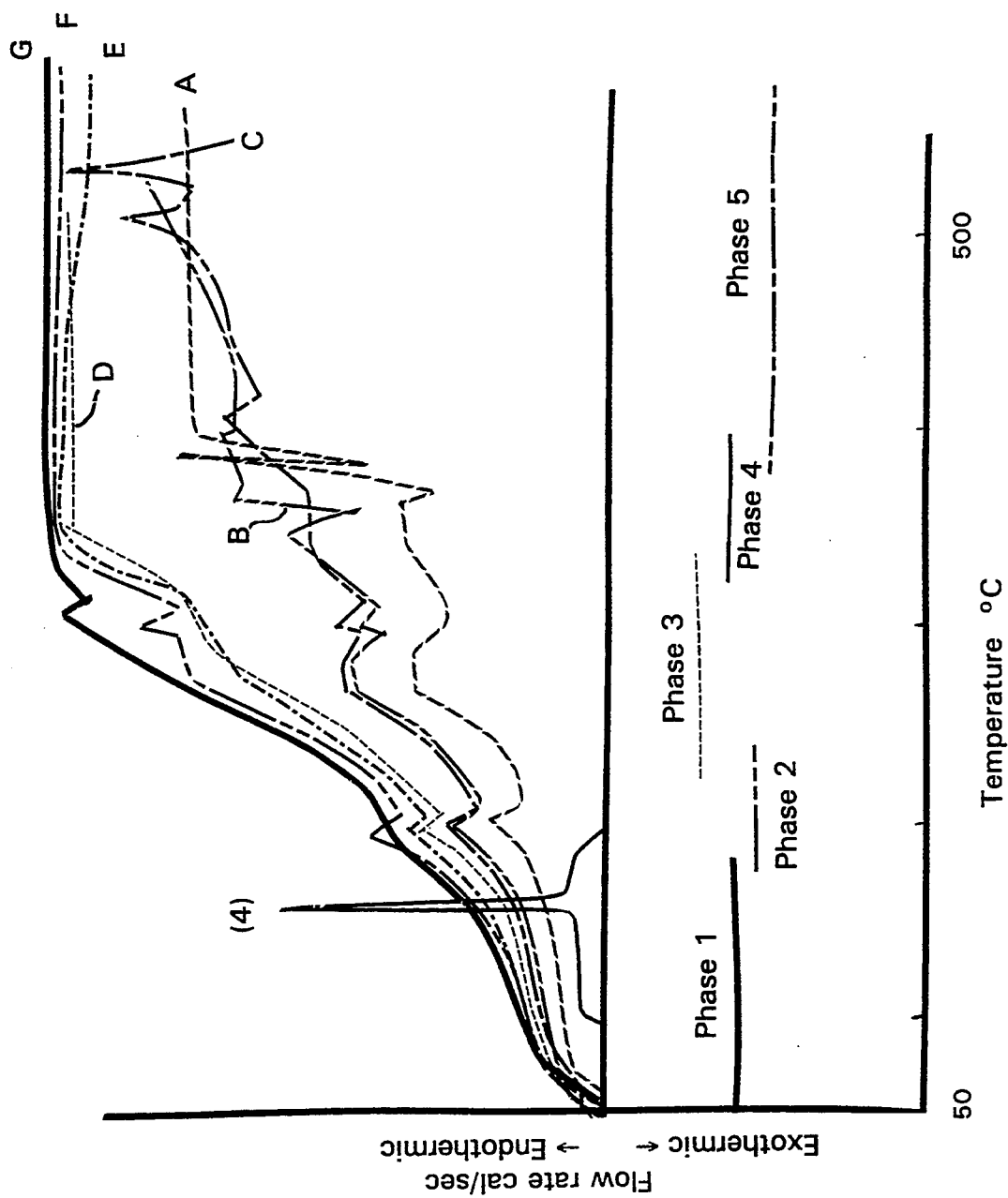
FIG. 3 is a graphical representation of differential scanning calorimetry thermograms for illustrative coating compositions in accordance with the present invention, as compared with prior art coating compositions.

The synergistic effects and heat absorbing effectiveness of different concentrations of diaquotetraamminezinc(II) fluoroborate and hexamminenickel(II) fluoroborate in epoxy formulations were studied by differential scanning calorimetry. Differing parts by weight of the coordination complexes were added to the following formulation (Table 1), and the DSC thermograms were charted as shown in FIG. 3. The formulations of Table 1 were made in two parts and mixed, in accordance with standard procedure. All figures are parts by weight.

TABLE 1

| EXAMPLE | A | B | C | D | E | F | G |
|---|---|---|---|---|---|---|---|
| MATERIAL | | | | | | | |
| Epoxy (EEW = 182–192) | 34.2 | 34.2 | 34.2 | 34.2 | 34.2 | 34.2 | 34.2 |
| Solvent | 5.1 | 5.1 | 5.1 | 5.1 | 5.1 | 5.1 | 5.1 |
| Pentaerythritol | 20.4 | 20.4 | 20.4 | 20.4 | 20.4 | 20.4 | 20.4 |
| Melamine | 28.6 | 28.6 | 28.6 | 28.6 | 28.6 | 28.6 | 28.6 |
| Polysulfide resin | 38.85 | 38.85 | 38.85 | 38.85 | 38.85 | 38.85 | 38.85 |
| Catalyst (amine) | 5.25 | 5.25 | 5.25 | 5.25 | 5.25 | 5.25 | 5.25 |
| Solvent | 31.35 | 31.35 | 31.35 | 31.35 | 31.35 | 31.35 | 31.35 |
| Ammonium Polyphosphate | 67.5 | 67.5 | 67.5 | 67.5 | 67.5 | 67.5 | 67.5 |
| AqAmZnBF$_4$ (Example 2) | 0 | 11.6 | 23.5 | 47.0 | 0 | 0 | 0 |
| AmNiBF$_4$ (Example 1) | 0 | 0 | 0 | 0 | 11.6 | 23.5 | 47.0 |

In FIG. 3, A is the standard epoxy coating material, B is 5% zinc complex, C is 10% zinc complex, D 20% zinc complex; E is 5% nickel complex; F is 10% nickel complex; and G is 20% nickel complex. The ordinate represents calories/second and the abscissa represents temperature (degrees C), so that the Figure shows the change in enthalpy of the system. The area under each curve is an indication of the material's effectiveness as a heat blocker. It will be seen that the behavior of all the materials falls into five phases: (1) up to about 180° C. the temperature within the material rises linearly (preheating phase); (2) from about 180° C. to about 230° C. the binder endothermically decomposes; (3) from about 230° to 325° C. the standard subliming agents undergo an endothermic phase change; (4) from about 325° C. to about 400° C. the material intumesces; and (5) above about 400° C. char is formed. Superimposed on this behavior, however, is a remarkable absorption of energy paralleling the results shown in FIG. 1 for the pure transition metal complexes.

As shown in FIG. 3, the compositions containing transition metal complexes in accordance with the present invention provide a remarkable effectiveness in hyperthermal heat blockage of a polyanionic-phosphorus-nitrogen system in an epoxy binder as compared with formulation A. Further, the time required for vitrification and the subsequent endothermic protection, and hence the contribution to a stable char formation in these systems happens at these formulations softens at a temperature just before endothermic decomposition of the complexes around 200° C.

EXAMPLE 7

To test the effectiveness of the materials of the present invention in presently standard intumescing coating materials, a basic fire-protective formulation having the solids content shown in the following Table 2 was made, solvent being added to each half to form the desired consistency:

TABLE 2

|  | Parts by weight |
| --- | --- |
| Epoxy resin (EEW = 182–192) | 22 |
| Penaterythritol | 8 |
| Melamine | 10 |
| Titanium dioxide | 6 |
| Glass fibers | 4 |
| Polysulfide | 22 |
| Curing agent | 3 |
| Ammonium polyphosphate | 23 |
| Glass fibers | 2 |

The formulation of Table 2 (identified as Example H) is a highly effective and efficient fire-protective formulation which operates in accordance with Feldman, U.S. Pat. No. 3,849,178, which when subjected to thermal extremes both undergoes an endothermic phase change and expands to form a continuous porosity matrix.

Improved formulations (Examples J-U) in accordance with the present invention were formed by adding to the basic fire-protective formulation of Table 2 (Example H) an additional 10, 30 and 50 parts by weight of materials in accordance with Examples 1–4 per 100 parts by weight of the basic fire-protective formulation, Example H.

These formulations were tested in a simulated fire environment to determine the rate of temperature rise of a protected substrate.

The protective formulations were sprayed onto a sample substrate. Following the guidelines of Department of Defense (Navy) test NADC-84170-60, the substrate is a 0.060" steel plate coated with 0.140" (140 mils) of protective material. The plate is protected on five sides by a ceramic pad. The exposed (coated) side of the plate is subjected to an air-vitiated liquid propane gas (LPG) flame having a temperature near its point of impingement on the sample of from 1800° to 2000° F. The rear (uncoated side) of the plate is provided with three thermocouples for measuring the temperature of the back of the plate, and the number of seconds required for the average thermocouple temperature to reach 500° F. is measured. The efficiency of each of the formulations was then calculated by dividing the number of seconds required for the average thermocouple temperature to reach 500° F. by the thickness in mils of the material (140).

TABLE 3

| EX-AMPLE | COORDINATION COMPLEX | PARTS | THERMAL EFFICIENCY |
| --- | --- | --- | --- |
| H | NONE | — | 3.14 sec/mil |
| J | Hexamminenickel(II) difluoroborate | 10 | 6.25 sec/mil |
| K | Hexamminenickel(II) difluoroborate | 30 | 5.39 sec/mil |
| L | Hexamminenickel(II) difluoroborate | 50 | 4.46 sec/mil |
| M | Diaquotetraamminezinc (II) fluoroborate | 10 | 6.39 sec/mil |
| N | Diaquotetraamminezinc (II) fluoroborate | 30 | 5.18 sec/mil |
| O | Diaquotetraamminezinc (II) fluoroborate | 50 | 5.07 sec/mil |
| P | Hexamminenickel(II)-polyphosphate | 10 | 6.39 sec/mil |
| Q | Hexamminenickel(II)-polyphosphate | 30 | 4.36 sec/mil |
| R | Hexamminenickel(II)-polyphosphate | 50 | 3.96 sec/mil |
| S | Diquotetraamminezinc(II)-polyphosphate | 10 | 7.68 sec/mil |
| T | Diquotetraamminezinc(II)-polyphosphate | 30 | 7.00 sec/mil |
| U | Diquotetraamminezinc(II)-polyphosphate | 50 | 6.39 sec/mil |

From the foregoing, it will be seen that the compositions of the present invention provide a remarkable and synergistic improvement in protection from fire and other hyperthermal extremes, even as compared with highly effective and efficient materials. In each of these cases, addition of up to about 10% of the transition metal complex to the standard formulation increased char and strengthened the char formed.

EXAMPLE 8

To compare the effectiveness of the formulas containing tricombic transition metal complexes as compared with the prior art, thermal protective materials were made corresponding generally to that of Example 11 of Feldman, U.S. Pat. 3,849,178. These formulations were as follows:

TABLE 4

|  | Parts by weight |
| --- | --- |
| Heat blocking material | 60 |
| Epoxy resin (EEW = 182–192) | 15 |
| Polysulfide resin | 15 |
| Tertiary amine curing agent | 5 |
| Solvent (toluene) | 5 |

The heat blocking material (EXAMPLES V-Z) for each formulation was as shown in the following Table 5. Each material was tested in a simulated fire environment to determine the rate of temperature rise of a protected substrate in accordance with the same procedure as in the foregoing Example 7, and the results, expressed in thermal efficiency was determined as shown in Table 5.

TABLE 5

| EX-AMPLE | HEAT BLOCKING MATERIAL | THERMAL EFFICIENCY |
| --- | --- | --- |
| V | Molybdenum hexacarbonyl (Prior art) | 2.00 sec/mil |
| W | Hexamminenickel(II) fluoroborate (Example 1) | 3.64 sec/mil |
| X | Diaquotetraamminezine(II) fluoroborate (Example 2) | 3.25 sec/mil |
| Y | Hexamminenickel(II)-polyphosphofluoroborate (Example 3) | 4.21 sec/mil |
| Z | Diaquotetraamminezinc(II)-polyphosphofluoroborate (Ex. 4) | 3.36 sec/mil |

EXAMPLE 9

The following compositions and tests were made to show the ability of compositions of the present invention to protect plastic materials from flame spread. A plastic material having the composition of the following Table 6 was formed:

TABLE 6

| | Parts by weight |
|---|---|
| Epoxy resin (DER-331) | 25 |
| Liquid polysulfide resin | 25 |
| Catalyst (DMP-30) | 4 |

To this material were added the hexamminenickel(II) difluoroborate and diaquotetraamminezinc(II) difluoroborate transition metal complexes of Examples 1 and 2 in loadings of 15%, 25%, and 35%. The unmodified material and modified materials were tested in accordance with Underwriters'Laboratory test UL94HB, using a thin strip of the cured material, clamping one end of the strip to hold the strip horizontal, and exposing the free end of the strip to a flame. It was found that the unloaded plastic strip burned rapidly, and that each of the loaded samples greatly reduced flammability under the test conditions. All but the 15% loaded diaquotetraamminezinc(II) difluoroborate sample were selfextinguishing.

Numerous variations in the materials and methods of the present invention will be apparent to those skilled in the art in light of the foregoing disclosure. Merely by way of example, the materials of the invention may be applied to a mesh support, such as the support of Feldman, U.S. Pat. No. 4,493,945 or otherwise. The materials, either in the form of the pure coordination complexes or the complexes in a carrier, may be incorporated into matrices such as porous materials. For example, by using a water-soluble complex, rather than the insoluble complexes of the foregoing examples, the materials may be absorbed into a wooden substrate. Of the illustrative materials, the zinc complexes tend to be more soluble than the nickel complexes. The materials may also be used in a viscous carrier under a porous skin in aerospace applications, to give a boundary layer and transpirational cooling under supersonic heating conditions; this arrangement permits simple reloading of the protective material after each use (flight).

These variations are merely illustrative.

We claim:

1. A process or protecting at least a part of an element from a hyperthermal condition comprising applying to said part of said element a protective composition, said composition comprising a coordination complex, said coordination complex comprising a transition metal combined by coordinate bonds with a definite number of surrounding ligands, and a step of subjecting said part to said hyperthermal condition, said coordination complex undergoing multiple endothermic transitions from solid to gaseous state over a substantial temperature range below the temperature of said hyperthermal condition to protect said part.

2. The process of claim 1 wherein the composition further comprises a binder, said coordination complex comprising from 5% to 90% by the weight of said composition, said composition being applied over a surface of said element.

3. The process of claim 2 wherein said binder softens at a temperature below an upper end of said temperature range.

4. The process of claim 3 wherein the protective composition intumesces and undergoes an endothermic phase change from a solid to a vapor at a temperature of about 200° C. to about 1,000° C.

5. The process of claim 4 wherein said temperature range is about 200° C. to about 500° C.

6. A process for protecting at least a part of an element from fire or thermal extreme comprising applying to said part of said element a protective composition, said composition comprising at least about 5% by weight of a cationic coordination complex, said coordination complex comprising a transition metal combined by coordinate bonds with a definite number of surrounding ligands, at least one of said ligands being chosen from the group consisting of ammonia, alkyl amine and water said coordination complex undergoing multiple endothermic transitions from solid to gaseous state over a substantial temperature range below the temperature of said fire or thermal extreme to protect said part.

7. The process of claim 1 wherein said coordination complex is a salt of a fluoride.

8. A process for protecting at least a part of an element from fire or thermal extreme comprising applying to said part of said element a protective composition, said composition comprising at least about 5% by weight of a cationic coordination complex, said coordination complex comprising a transition metal combined by coordinate bonds with a definite number of surrounding ligands, said coordination complex undergoing multiple endothermic transitions from solid to gaseous state over a substantial temperature range below the temperature of said fire or thermal extreme to protect said part, said coordination complex being a salt of a fluoride chosen from the group consisting of boron tetrafluoride, antimony hexafluoride, and tin hexafluoride.

9. A process for protecting at least a part of an element from fire or thermal extreme comprising applying to said part of said element a protective composition, said composition comprising at least about 5% by weight of a coordination complex, said coordination complex comprising a transition metal combined by coordinate bonds with six ligands, said coordination complex undergoing multiple endothermic transitions from solid to gaseous state over a substantial temperature range above an expected ambient temperature of said part and below the temperature of said fire or thermal extreme.

10. A composition for protecting substrates from fire or thermal extreme, said composition comprising a binder and a coordination complex in said binder, said coordination complex undergoing multiple endothermic transitions from solid to gaseous state over a substantial temperature range above an expected normal ambient temperature and below the temperature of said fire or thermal extreme, said coordination complex including a transition metal combined by coordinate bonds with a definite number of surrounding ligands, said coordination complex comprising from 5% to 90% by weight of said composition.

11. The composition of claim 10 wherein said binder softens at a temperature below an upper end of said temperature range.

12. The composition of claim 11 wherein the binder and the coordination complex are chosen to cause the protective composition to intumesce at a temperature in a range from about 200° C. to about 1,000° C.

13. The composition of claim 12 wherein said temperature range is about 200° C. to about 500° C.

14. A composition for protecting substrates from fire or thermal extreme, said composition comprising a binder and a coordination complex in the binder, said coordination complex comprising a cationic complex of a transition metal combined by coordinate bonds with a definite number of surrounding ligands, at least one of said ligands being chosen from the group consisting of ammonia, alkyl amine, and water, said coordination complex undergoing multiple endothermic transitions from solid to gaseous state over a substantial temperature range above an expected normal ambient temperature and below the temperature of said fire or thermal extreme, said coordination complex comprising from 5% to 90% by weight of said composition.

15. A composition for protecting substrates from fire or thermal extreme, said composition comprising a binder and a coordination complex in the binder, said coordination complex comprising a transition metal combined by coordinate bonds with a definite number of surrounding ligands, said coordination complex undergoing multiple endothermic transitions from solid to gaseous state over a substantial temperature range above an expected normal ambient temperature and below the temperature of said fire or thermal extreme, said coordination complex comprising from 5% to 90% by weight of said composition, the coordination complex being a salt containing boron.

16. A composition for protecting substrates from fire or thermal extreme, said composition comprising a binder and a coordination complex in the binder, said coordination complex comprising a transition metal combined by coordinate bonds with a definite number of surrounding ligands, said coordination complex undergoing multiple endothermic transitions from solid to gaseous state over a substantial temperature range above an expected normal ambient temperature and below the temperature of said fire or thermal extreme, said coordination complex comprising from 5% to 90% by weight of said composition, the coordination complex being a salt of an anion chosen from the group consisting of boron tetrafluoride, antimony hexafluoride, and tin hexafluoride.

17. A composition for protecting substrates from fire or thermal extreme, said composition comprising a binder and a coordination complex in the binder, said coordination complex comprising a transition metal combined by coordinate bonds with six ligands, said coordination complex undergoing multiple endothermic transitions from solid to gaseous state over a substantial temperature range above an expected normal ambient temperature and below the temperature of said fire or thermal extreme, said coordination complex comprising from 5% to 90% by weight of said composition.

18. A composition for protecting substrates from fire or thermal extreme, said composition comprising a binder and a coordination complex in the binder, said coordination complex comprising a transition metal combined by coordinate bonds with a definite number of surrounding ligands, said coordination complex undergoing multiple endothermic transitions from solid to gaseous state over a substantial temperature range above an expected normal ambient temperature and below the temperature of said fire or thermal extreme, said coordination complex being prereacted with a polyphosphate to form a conjugate, said conjugate comprising at least about 5% by weight of said composition.

19. A composition for protecting substrates from fire or thermal extreme, said composition comprising an epoxy polymer binder selected to soften below the temperature of said fire or thermal extreme and a coordination complex in the binder, said coordination complex comprising a transition metal combined by coordinate bonds with a definite number of surrounding ligands, said coordination complex undergoing multiple endothermic transitions from solid to gaseous state over a substantial temperature range above an expected normal ambient temperature and below the temperature of said fire or thermal extreme, said coordination complex and said epoxy binder being chosen to cause the composition to intumesce when the composition is exposed to said fire or thermal extreme.

20. An article of manufacture comprising a substrate and a thermal protective composition applied to said substrate for protecting said substrate from fire or thermal extreme, said composition comprising at least about 5% by weight of a coordination complex, said coordination complex comprising a transition metal bound to at least two ligands, said coordination complex undergoing multiple endothermic transitions from solid to gaseous state over a substantial temperature range below the temperature of said fire or thermal extreme.

21. The article of claim 20 wherein said substrate is porous and said composition is impregnated into the substrate.

22. The article of claim 20 wherein the substrate is porous and the composition is applied to a side of the substrate away from an expected direction of impingement of fire or thermal extreme.

23. The article of claim 20 wherein the composition is applied as a coating to the substrate.

24. The article of claim 23 further comprising means for spacing the composition from the substrate.

25. The article of claim 24 wherein the means for spacing the composition from the substrate comprises a mesh applied to the substrate.

26. The article of claim 23 wherein the composition comprises a binder and said coordination complex, said binder making the composition self-adherent to the substrate and said coordination complex comprising from 5% to 90% by weight of said composition.

27. The article of claim 26 wherein said binder comprises an epoxy resin.

28. An article of manufacture formed by molding or by extruding, said article comprising a polymeric binder and at least about 5% by weight of a coordination complex, said coordination complex comprising a transition metal combined by coordinate bonds with a definite number of surrounding ligands, said coordination complex undergoing multiple endothermic transitions from solid to gaseous state over a substantial temperature range below the temperature of said fire or thermal extreme.

29. A fire protective composition comprising the reaction product of a coordination complex comprising a transition metal combined by coordinate bonds with a definite number of surrounding ligands and a polyanionic phosphorus-containing compound.

30. The fire protective composition of claim 29 wherein the polyanionic phosphorus-containing compound is a polyphosphate.

31. The fire protective composition of claim 29 further comprising a binder, said coordination complex comprising from 5% to 90% by weight of said composition.

32. A fire protective composition comprising a salt of a cation chosen from the group consisting of a nickel coordination complex comprising a nickel ion combined by coordinate bonds with a definite number of surrounding ligands and a zinc coordination complex comprising a zinc ion combined by coordinate bonds with a definite number of surrounding ligands and an anion containing at least one element chosen from the group consisting of boron and halogen.

33. The composition of claim 32 wherein the cation includes at least one ammonia ligand.

34. A process for protecting at least a part of an element from fire or extreme thermal conditions comprising applying to said part of said element a protective composition, said composition comprising at least about 5% by weight of a cationic coordination complex, said coordination complex comprising a transition metal combined by coordinate bonds with a definite number of surrounding ligands, said coordination complex undergoing multiple endothermic transitions from solid to gaseous state over a substantial temperature range above an expected ambient temperature of said element and below the temperature of said fire or thermal extreme.

35. A composition for protecting substrates from fire or thermal extremes, said composition comprising a binder and a cationic coordination complex in the binder, said coordination complex comprising a transition metal combined by coordinate bonds with a definite number of surrounding ligands, said coordination complex undergoing multiple endothermic transitions from solid to gaseous state over a substantial temperature range above an expected normal ambient temperature and below the temperature of said fire or thermal extreme, said coordination complex comprising from 5% to 90% by the weight of said composition.

36. A composition for protecting substrates from fire or thermal extremes, said composition comprising a binder and a coordination complex in the binder, said coordination complex comprising a transition metal combined by coordinate bonds with a definite number of surrounding ligands, said coordination complex undergoing multiple endothermic transitions from solid to gaseous state over a substantial temperature range above an expected normal ambient temperature and below the temperature of said flame or thermal extreme, said coordination complex comprising from 20% to 70% by the weight of said composition.

37. A composition for protecting substrates from fire or thermal extremes, said composition comprising a binder and a coordination complex in the binder, said coordination complex comprising a transition metal combined by coordinate bonds with a definite number of surrounding ligands, at least two of said ligands being chosen from the group consisting of water, ammonia, alkyl amine, and chelating ligands, said coordination complex undergoing multiple endothermic transitions from solid to gaseous state over a substantial temperature range above an expected normal ambient temperature and below the temperature of said flame or thermal extreme.

38. A process for protecting at least a part of an element from flame or extreme thermal conditions comprising applying to said part of said element a protective composition, said composition comprising at least about 5% by weight of a coordination complex, said coordination complex comprising a transition metal combined by coordinate bonds with a definite number of surrounding ligands, at least two of said ligands being chosen from the group consisting of water, ammonia, alkyl amine, and chelating ligands, said coordination complex undergoing multiple endothermic transitions from solid to gaseous state over a substantial temperature range above an expected ambient temperature of said element and below the temperature of said flame or thermal extreme.

* * * * *

UNITED STATES PATENT AND TRADEMARK OFFICE
CERTIFICATE OF CORRECTION

PATENT NO. : 5,372,846
DATED : December 13, 1994
INVENTOR(S) : Rubin Feldman, et. al.

It is certified that error appears in the above-identified patent and that said Letters Patent is hereby corrected as shown below:

Column 3, line 56, delete the word "alkyleneimines" and insert--alkenediamines--;

Column 8, line 66, insert after "happens at" and before "these formulations", than with formulation A. It will also be seen that the resinous binder of--

Column 9, line 12, delete the word "Penaterythritol" and isnert --Pentaerythritol--.

Column 11, line 46, delete the word "or" and insert --for--.

Signed and Sealed this

Tenth Day of March, 1998

Attest:

BRUCE LEHMAN

Attesting Officer

Commissioner of Patents and Trademarks